April 8, 1924.

C. E. CHAPMAN 1,489,659

WELDING TORCH BURNER

Filed July 8, 1922

2 Sheets—Sheet 1

Inventor
C. E. Chapman.

By
Lacey & Lacey, Attorneys

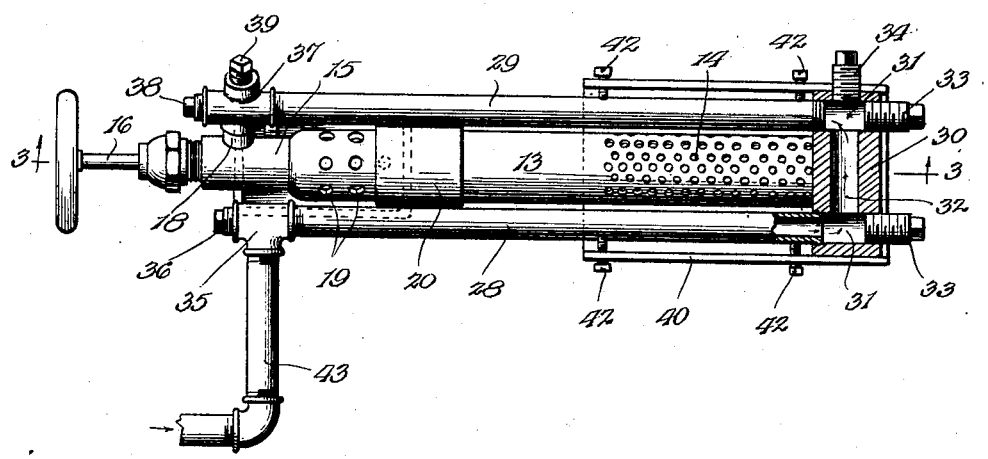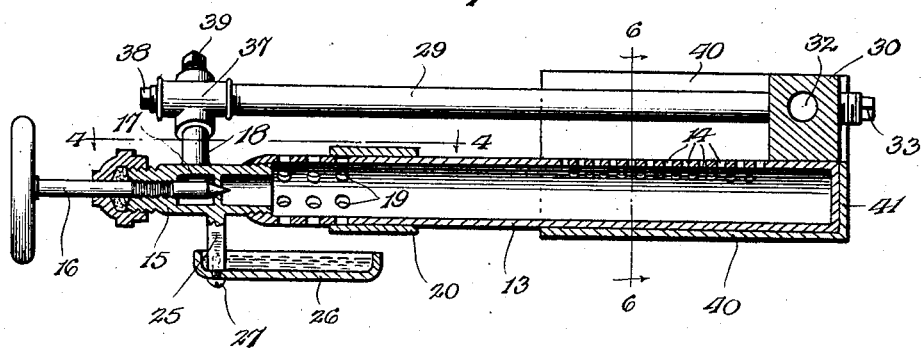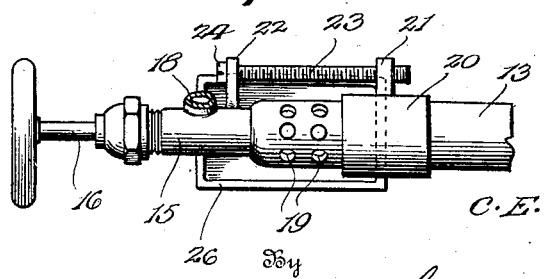

Patented Apr. 8, 1924.

1,489,659

UNITED STATES PATENT OFFICE.

CHARLES E. CHAPMAN, OF FORT EDWARD, NEW YORK, ASSIGNOR OF ONE-HALF TO JOSEPH GOODFELLOW, OF FORT EDWARD, NEW YORK.

WELDING-TORCH BURNER.

Application filed July 8, 1922. Serial No. 573,642.

*To all whom it may concern:*

Be it known that I, CHARLES E. CHAPMAN, citizen of the United States, residing at Fort Edward, in the county of Washington and State of New York, have invented certain new and useful Improvements in Welding-Torch Burners, of which the following is a specification.

This invention relates to an improved welding torch burner and seeks, as one of its principal objects, to provide a burner wherein the fuel will be effectually heated, vaporized and mixed with air before being ignited to thus obtain maximum results with a minimum consumption of fuel.

The invention has as a further object to provide a burner employing superheater tubes through which the fuel will be caused to flow and wherein said tubes will be so arranged that the flame will constantly play thereagainst for heating the tubes.

A still further object of the invention in this connection is to provide a burner embodying a mixing tube, wherein superheated gas and air will be permitted to mix in said tube but wherein the resultant fuel mixture will be prevented from igniting within the tube from the flame exteriorly of the tube.

And the invention has as a still further object to provide a burner which will be characterized by structural simplicity and ease of regulation and wherein the burner will be so constructed that it may be readily cleaned.

Other and incidental objects will appear hereinafter.

In the drawings:

Figure 1 is a side elevation showing the burner in connection with my improved torch tank which forms the subject matter of my co-pending application filed of even date herewith, Figure 2 is a plan view of the burner, parts being shown in section, Figure 3 is a longitudinal sectional view through the burner on the line 3—3 of Figure 2, looking in the direction of the arrows, Figure 4 is a detail sectional view on the line 4—4 of Figure 3, looking in the direction of the arrows, Figure 5 is an end elevation of the burner, Figure 6 is a transverse sectional view on the line 6—6 of Figure 3, looking in the direction of the arrows, and Figure 7 is a detail section showing the mounting of the adjusting screw for the air valve of the device.

Referring now more particularly to the drawings, I have, in Figure 1, shown my improved burner in connection with a blow torch tank 10 which, as previously indicated, forms the subject matter of my co-pending application filed of even date herewith. It is, accordingly, unnecessary to describe said tank in detail. However, it may be noted that the tank is adapted to supply fuel under pressure to the burner, the tank being provided with a fuel outlet pipe 11 at the upper end of which is an appropriate shut-off valve 12.

Coming now more particularly to the subject of the present invention, I employ a mixing tube 13 closed at its outer end and provided at its outer end portion with a plurality of jet openings 14 opening through the upper side of the tube, the openings being preferably arranged in longitudinally directed rows. Threaded into the mixing tube at its inner end is the casing 15 of a fuel valve 16, the valve casing being formed with a valve chamber 17 into which leads a nipple 18. Formed in the mixing tube near its inner end, is a plurality of air inlet openings 19 arranged at spaced points circumferentially of the tube and slidable upon the tube is an air valve 20 surrounding the tube, this valve being provided with a laterally directed lug 21. Extending from the valve casing 15 is an arm 22 through which is swiveled an adjusting screw 23 threaded through the lug 21 of the air valve and detachably securing said screw to the arm 20 is a cap screw 24 threaded into the inner end of the screw 23, the cap screw 24 being squared to accommodate a wrench as well as also provided with a screw driver slot so that said screw may be readily engaged for turning the adjusting screw and shifting the valve 20 along the burner tube to cover or uncover the openings 19. Depending from the valve casing 15 is an arm 25 upon which is mounted a priming pan 26 extending beneath the mixing tube in spaced relation at the air inlet openings 19 and detachably connecting said pan to the arm is a screw 27.

Extending above the mixing tube in spaced parallel relation thereto is a superheater tube 28 lying in a plane slightly at one side of the mixing tube and arranged in a plane slightly spaced at the opposite side of the tube is a similarly disposed superheater tube 29. Connecting these tubes at their forward ends is a header 30 resting upon the forward end of the mixing tube. In order to withstand the temperature to which this header is subjected in the operation of the burner, the header is formed from a solid metal block bored near its ends to provide transverse passages 31 therethrough and also bored longitudinally from one end thereof to provide a medially disposed passage 32 connecting said first mentioned passages. As shown in Figure 2, the tubes 28 and 29 are threaded into the inner ends of the passages 31 and threaded into said passages at their outer ends are closure plugs 33 which are elongated to prevent shrinking. Threaded into the open end of the passage 32 is a closure plug 34 similar to the plugs 33. Connected to the pipe 28 at its rear end is a T-coupling 35 into which is threaded a closure plug 36 and connecting the superheater tube 29 at its rear end with the nipple 18 of the valve casing 15, is a T-coupling 37. Threaded into this coupling are closure plugs 38 and 39. Thus, as will be seen, the plugs 33, 36 and 38 may be removed when the superheater tubes 28 and 29 as well as the passages 31 of the header 30 may be readily cleaned while, by removing the plug 34, the passage 32 of the header may be readily cleaned. Similarly, by removing the plug 39, the nipple 18 may be cleaned. The device may, accordingly, be readily kept in proper working condition. Extending beneath the mixing tube 13 at the forward end thereof is a trough shaped hood 40 for protecting the flame. This hood is open at its rear end while at its forward end said hood is provided with a front wall 41 abutting the forward end of the tube limiting the hood against rearward displacement. As brought out in Figure 6, the side walls of the hood extend upwardly at the outer sides of the superheater tubes 28 and 29 and threaded through said walls to engage the tubes are cap screws 42 detachably securing the hood in position. Connecting the T-coupling 35 of the burner with the valve 12 of the tank 10 is a feed pipe 43 supporting the burner upon the tank.

In operation, the inner end of the mixing tube is first heated by igniting fuel in the pan 26, when the valve 16 is opened. Liquid fuel will then flow through the superheater tube 28 to the header 30, through the header to the superheater tube 29 to enter the valve chamber 17 when the fuel will issue past the valve into the inner end of the mixing tube, from which point the fuel will continue through the openings 14 of said tube to be ignited. As shown in Figure 6, the outermost rows of the openings 14 in the mixing tube are so disposed that the flame produced at said rows of openings will be directed laterally in opposite directions to impinge the tubes 28 and 29. Accordingly, these tubes will be subjected to an intense heat. Moreover, due to the proximity of the header 30 to the flame, the header will also be subjected to an intense heat, the header, in being solid, tending to provide a heat storage element. Accordingly, as the fuel flows through the tube 28, said fuel will be heated before entering the header, when the fuel will be further heated within the header. Then, as the fuel leaves the header and flows through the tube 29, the fuel will be still further heated, with the result that a highly heated fuel vapor will be supplied at the inner end of the mixing tube. At this point, air will be admitted into the tube through the openings 19, the quantity of air being regulated by adjustment of the valve 20. The fuel vapor will thus become mixed with the air as the air and vapor flow forwardly within the mixing tube, to provide a highly combustible fuel mixture, it being possible to adjust the valve 20 so as to secure practically perfect combustion. An intensely hot flame will be accordingly produced. In practice, fuel is supplied through the pipe 43 at a very high pressure, with the result that the fuel vapor will issue past the fuel valve of the burner at a correspondingly high velocity, creating a pressure in the forward end of the mixing tube beneath the jet openings therein. Moreover, as will be noted, these openings are small, the minute size of the openings tending to break up the fuel mixture as it flows therethrough and, in this connection, it is to be observed that the combined cross sectional area of said openings is less than the cross sectional area of the mixing tube. Accordingly, the flow of fuel mixture will be choked at said openings to further increase the pressure of the mixture within the tube. The pressure against the mixture so produced will, as has been found in actual use, effectually prevent the ignition of the fuel mixture within the tube by the flame exteriorly of the tube, to cause failure of the burner.

Having thus described the invention, what is claimed as new is:

1. A welding torch burner including a mixing tube having jet openings, a fuel valve controlling flow of fuel into the tube, superheater tubes extending longitudinally of the mixing tube thereabove in proximity to said jet openings and connected to said valve, a header connecting the superheater tubes, and a hood extending beneath the mixing tube embracing said superheater tubes and housing the header.

2. A welding torch burner including a mixing tube having jet openings, a fuel valve controlling flow of fuel into the tube, superheater tubes extending in proximity to said jet openings and connected with said valve, a hood shielding said jet openings and disposed to deflect flame therefrom toward said superheater tubes, and means detachably connecting the hood with the superheater tubes to be supported thereby.

In testimony whereof I affix my signature.

CHARLES E. CHAPMAN. [L. S.]